C. H. GASKILL.
SWING TRUCK.
APPLICATION FILED DEC. 6, 1915.
1,190,143.
Patented July 4, 1916.
2 SHEETS—SHEET 2.
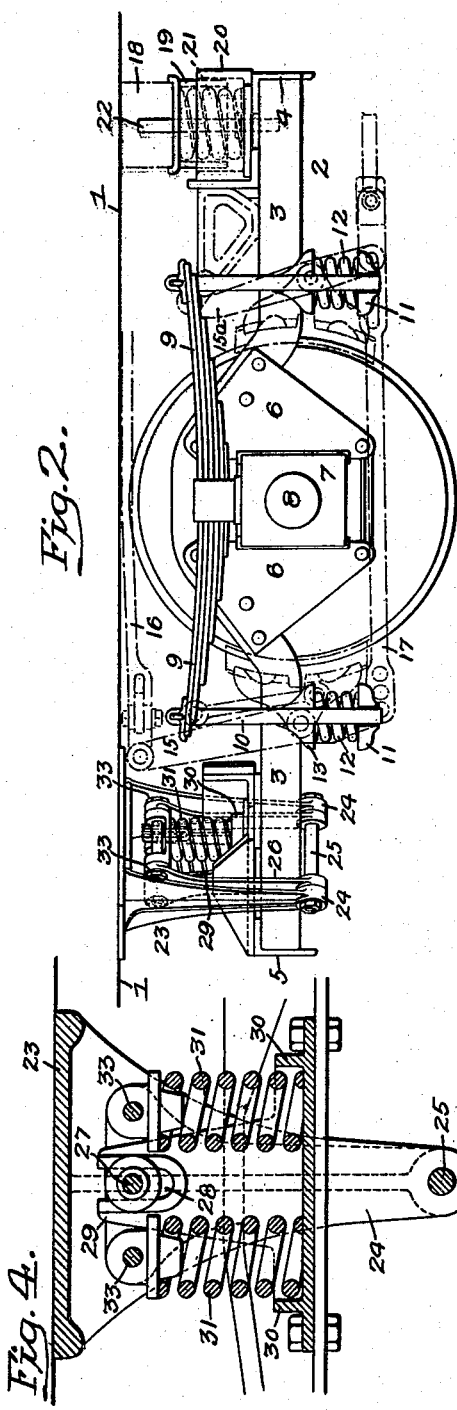
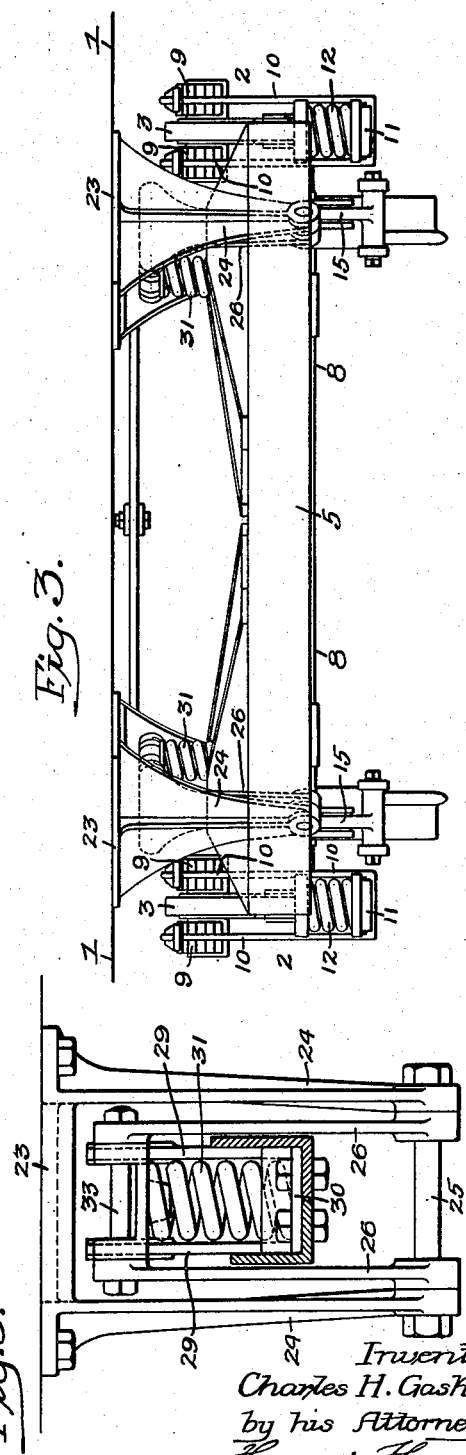
Inventor:-
Charles H. Gaskill
by his Attorneys.-
Howson & Howson

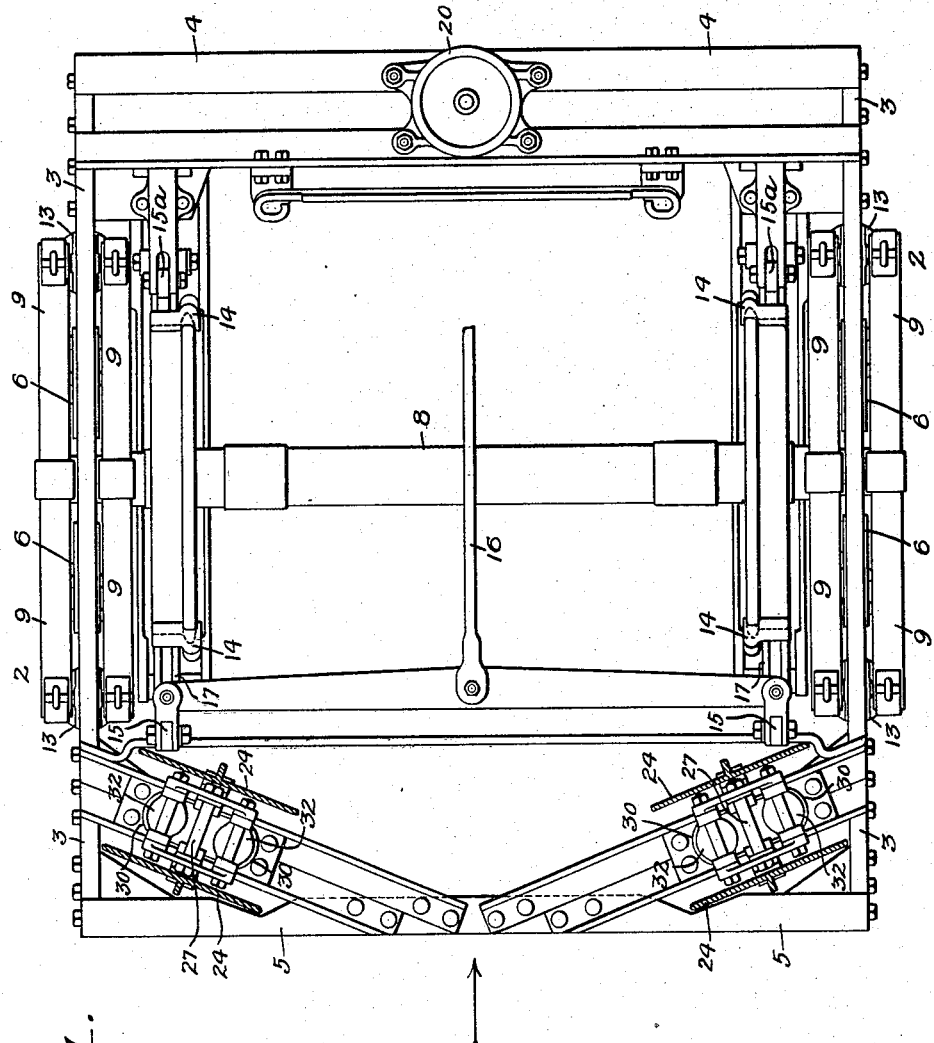

UNITED STATES PATENT OFFICE.

CHARLES H. GASKILL, OF PHILADELPHIA, PENNSYLVANIA, ASSIGNOR TO THE BALDWIN LOCOMOTIVE WORKS, OF PHILADELPHIA, PENNSYLVANIA, A CORPORATION OF PENNSYLVANIA.

SWING-TRUCK.

1,190,143.     Specification of Letters Patent.     Patented July 4, 1916.

Application filed December 6, 1915. Serial No. 65,406.

*To all whom it may concern:*

Be it known that I, CHARLES H. GASKILL, a citizen of the United States, residing in Philadelphia, Pennsylvania, have invented certain Improvements in Swing-Trucks, of which the following is a specification.

My invention relates to certain improvements in cars of the type which are mounted on four wheels. These cars are usually mounted on a single truck rigidly secured to the car body.

The object of my invention is to construct the trucks of this type of car so that the wheel base will be extended, and yet the car will be allowed to pass freely around curves of a limited radius. This object I attain in the following manner, reference being had to the accompanying drawings, in which:—

Figure 1, is a plan view, showing the hangers depending from the car body in section; Fig. 2, is a side view of the truck illustrated in Fig. 1; Fig. 3, is an end view looking in the direction of the arrow, Fig. 1; Fig. 4, is a side view of the swing link mechanism at one end of the truck; and Fig. 5, is an end view of the same.

1 is a line representing the bottom of the car body.

2 is the truck frame, consisting of the side frames 3 and cross members 4 and 5.

6, 6 are the pedestals secured to the side frames, and mounted to slide vertically in the pedestals are the boxes 7 for the axles 8.

9 is a semi-elliptic spring connected to links 10, which extend under the side frames and support the seats 11 for the coiled springs 12, which rest against seats 13 secured to the side frames 3.

14, 14 are the brake shoes connected to levers 15, 15ª, the lever 15ª being pivoted to the truck frame while the lever 15 is connected to an operating rod 16. The two levers are connected by a rod 17 in the ordinary manner.

It will be understood that this truck mechanism and the particular construction of the truck described above may be modified without departing from the essential features of the invention.

18 is the body bolster to which is secured the center pin 19, which is adapted to a center bearing 20 secured to the cross members 4, and mounted between the center pin and the bearing is a coiled spring 21.

22 is the king pin securing the parts together. The truck is pivoted at this point and, as the pivot point is some distance from the center, the wheels can swing radially out of line with the longitudinal center of the car so that, when the two trucks are placed a considerable distance apart, the car is able to pass around a curve of very limited radius.

In order to allow the truck to swing on its pivot and to return to its normal position, I secure to the under side of the car body a bearing 23 having two arms 24 carrying at their lower ends a shaft 25, and mounted on the shaft are links 26 having a bolt 27 adapted to a slot 28 in a standard 29 projecting from a spring seat 30 on which are mounted the coiled springs 31, and resting on the upper end of each coiled spring is a spring seat 32 pivotally mounted on the bolts 33 carried by the links 26, as clearly shown in Figs. 4 and 5. There is one of these devices at each side of the truck at the opposite end from the pivot 19, so that as the truck moves on its pivot in passing around a curve the links 26 swing on the shaft 25 of the bearings 23 on the car body and this rocking motion is imparted to the springs 31, compressing one and releasing the other of each pair of devices. As soon as the car passes around a curve the springs return the mechanism to its normal position and tend to straighten the truck and to keep it in this position until the truck is again forced to either side by the wheels passing around a curve. As there is one of these trucks at each end of the car, it will be seen that the wheels of the car can be placed a considerable distance apart, thus increasing the wheel base and causing the car to ride much easier than where the wheels are comparatively close together, and yet this extended wheel base will not interfere with a car passing around comparatively sharp curves.

I claim:—

1. The combination in a car of the four wheel type, of a body; two trucks, each truck having a single axle; wheels mounted on the axles; a pivot for the truck off center in respect to the axle; two bearings depending from the under side of the car body; links pivoted to the bearings; and two coiled springs mounted one on each side of the center of the links and resting upon the frame of the truck so that, as the truck swings on its pivot, one spring will be compressed while the other will be released, allowing the truck to swing laterally, the springs returning the truck and holding it yieldingly in its normal position.

2. The combination in a car, of a truck having a single axle; a car body; a pivot for the truck located at one end thereof; two swing link mechanisms at the opposite end of the truck and located one on each side thereof, each mechanism consisting of a bearing secured to the under side of the car body; two links connected to the bearing and having a cross pin; a guide carried by the truck for the cross pin; two pins, one at each side of the center of the link; a spring seat on each pin; and a coiled spring mounted between the spring seats and the frame of the truck so that, as the truck swings under the car in passing around curves, the swing link mechanism will allow the truck to swing laterally and will return the truck, holding it yieldingly in its normal position so that the car will ride without undue lateral motion when on a straight track.

3. The combination in a car of the four wheel type, of a body; two single axle trucks mounted under the body; wheels on the axles; a pivot connecting each truck with the car body at one end of the truck; a spring mounted at the pivot so that the pivot end of the truck will be yieldingly supported; two swing link mechanisms connecting the opposite end of each truck with the car body, each swing link mechanism consisting of a bracket secured to the under side of the car body; links pivoted to the lower end of the brackets; and spring seats pivotally connected to the upper ends of the links at each side of the center thereof; springs located between the spring seats and the truck; boxes for the axles; and springs yieldingly connecting the boxes with the truck frame.

CHARLES H. GASKILL.

Copies of this patent may be obtained for five cents each, by addressing the "Commissioner of Patents. Washington, D. C."